Patented May 2, 1933

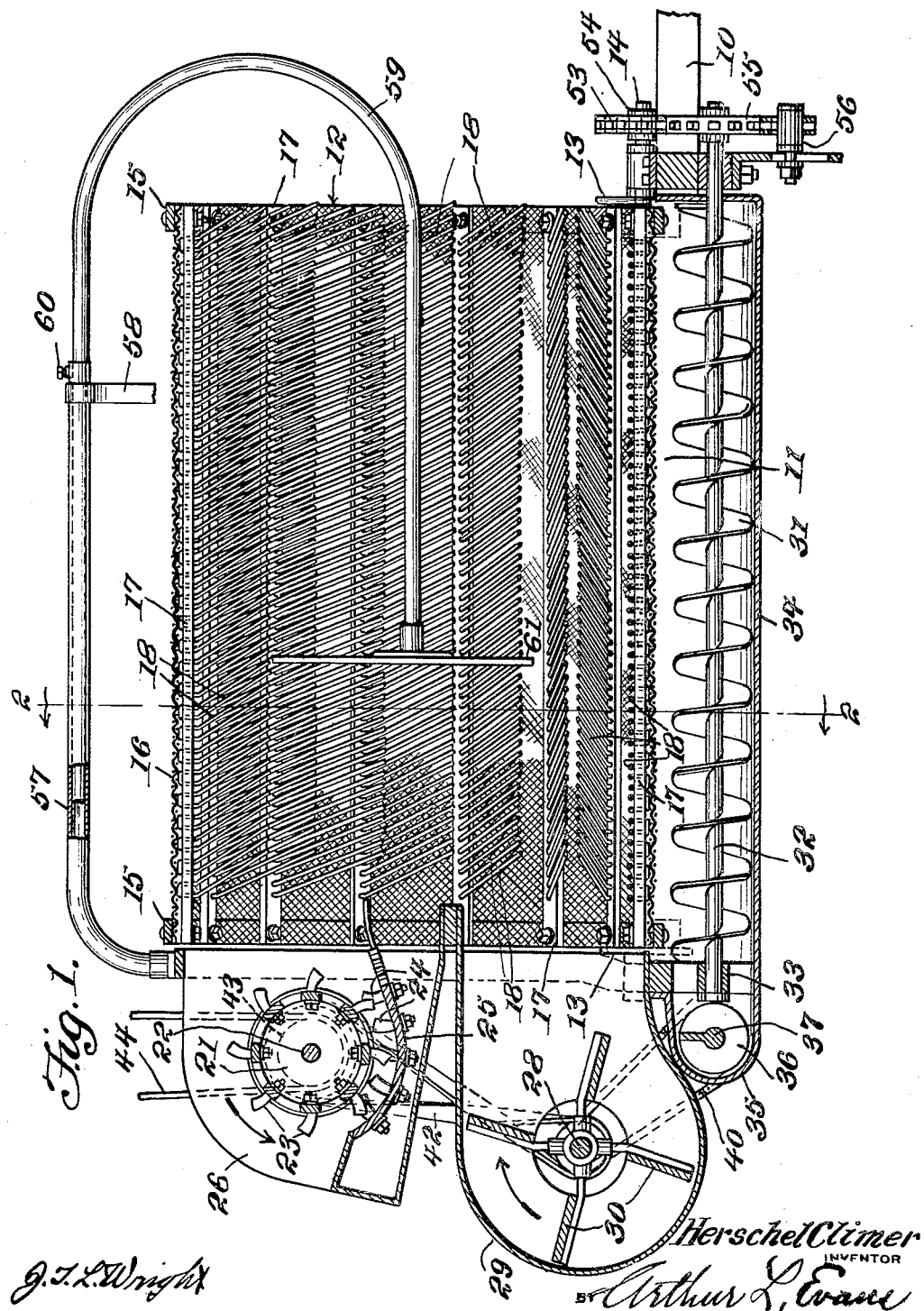

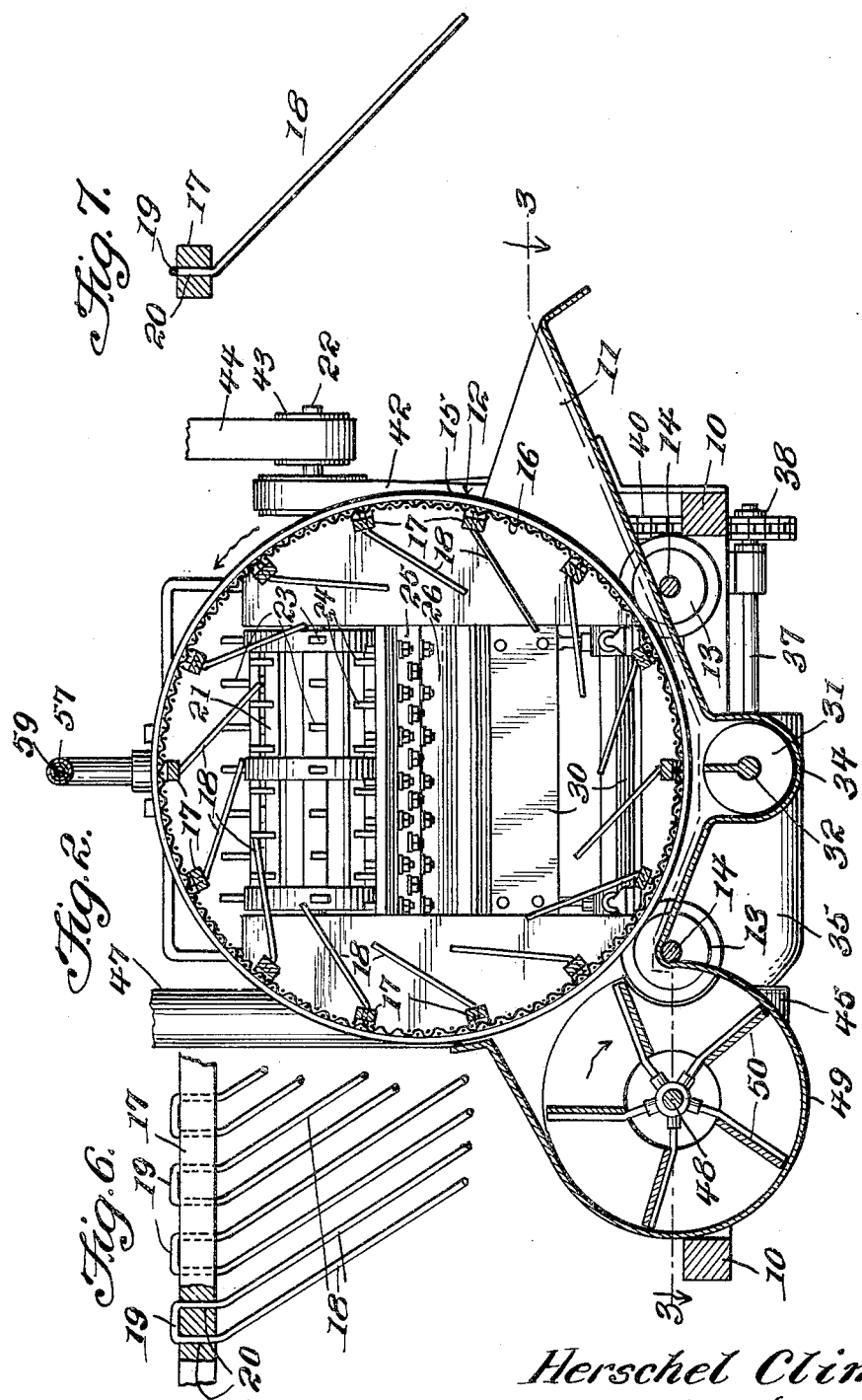

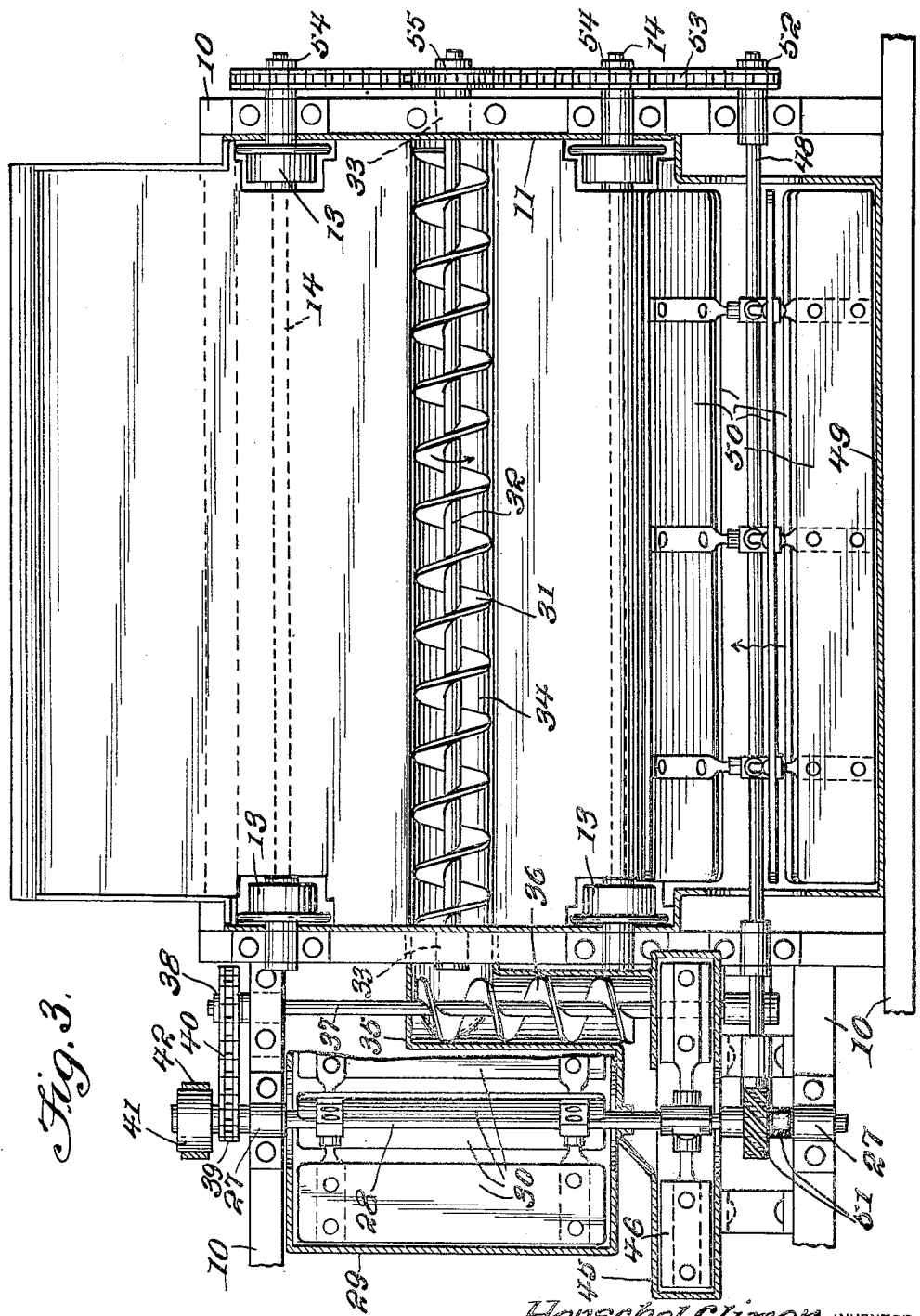

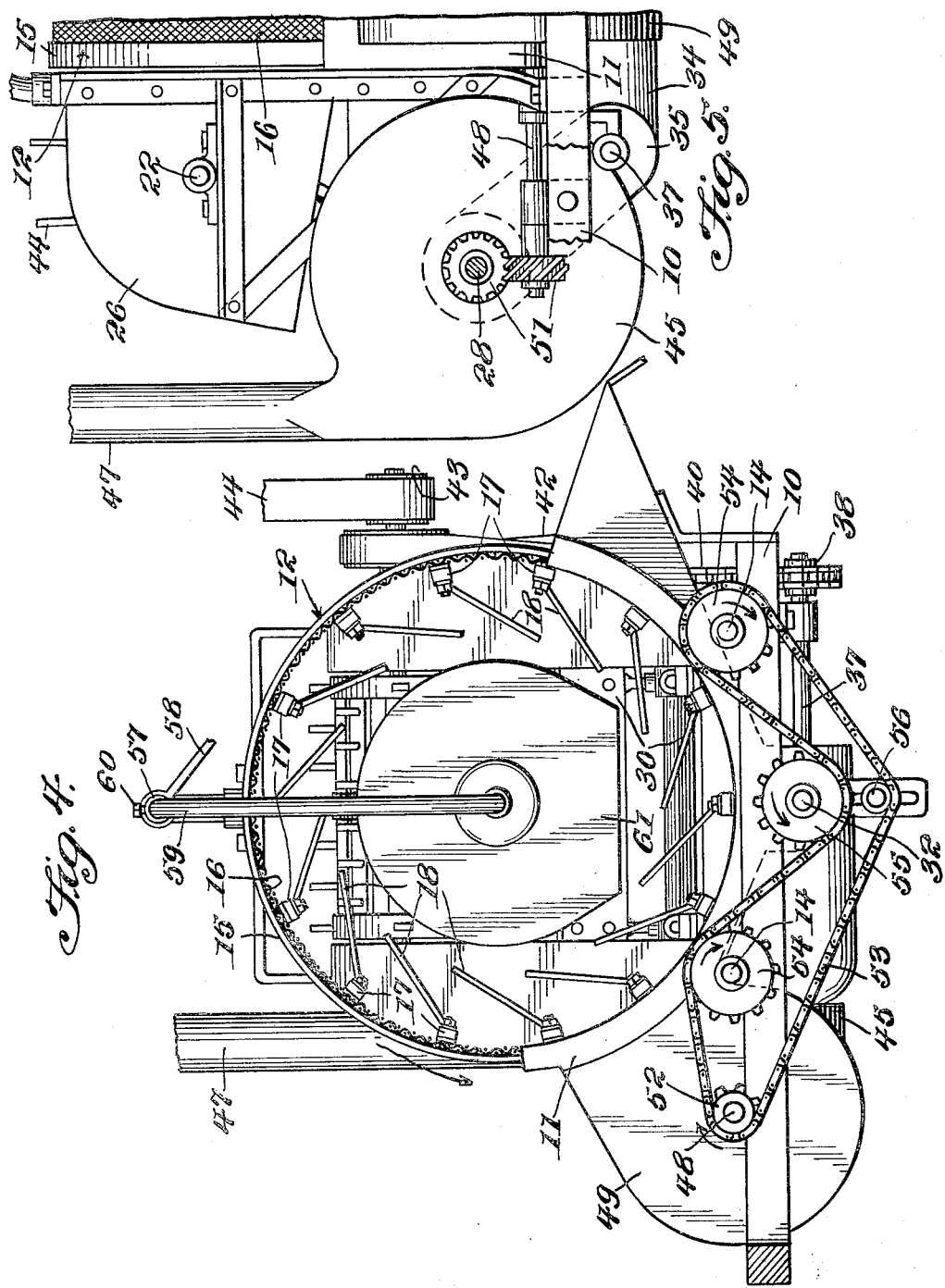

1,907,344

UNITED STATES PATENT OFFICE

HERSCHEL CLIMER, OF VEGA, TEXAS

GRAIN SEPARATOR

Application filed May 22, 1931. Serial No. 539,340.

This invention relates to grain separators or threshers and has for an object the provision of a machine which may receive the straw and grain from a harvesting machine, separate the grain from the straw and chaff and elevate the separated grain into a bin or other container.

Another object of the invention is the provision of a thresher and separator which may form a part of a combine harvester.

Another object of the invention is the provision of a combined thresher and separator having a novel form of cylinder, in which the grain is separated from the straw and chaff and carried to a suitable container or receptacle in a thoroughly cleaned condition.

With the above and other objects in view, the invention further includes the following novel features and details of construction, to be hereinafter more fully described, illustrated in the accompanying drawings and pointed out in the appended claims.

In the drawings:—

Figure 1 is a vertical longitudinal sectional view of the invention.

Figure 2 is a section on the line 2—2 of Figure 1.

Figure 3 is a section on the line 3—3 of Figure 2.

Figure 4 is an end view.

Figure 5 is a fragmentary side elevation at one end of the machine, with parts broken away and shown in section.

Figure 6 is a fragmentary plan view partly in section, showing the arrangement of the thresher fingers.

Figure 7 is a transverse sectional view of the same.

Referring to the drawings in detail wherein like characters of reference denote corresponding parts, the machine as shown comprises a frame which includes longitudinally disposed sills 10, a casing 11, and a cylinder 12. The cylinder is mounted for rotation upon flanged rollers 13, provided at opposite ends of the frame, the rollers being mounted upon longitudinally disposed shafts 14.

The cylinder includes end frames 15 to which are secured the opposite ends of a woven wire or other foraminous material 16 which is adapted for the passage of grain. Arranged longitudinally within the cylinder are circumferentially spaced bars 17. These bars are secured to the end frames 15 and serve to reinforce and strengthen the cylinder structure. In addition, these bars carry spaced rearwardly and circumferentially inclined fingers 18 whose inner looped ends 19 pass through openings 20 provided in the bars 17.

Straw and grain from the harvester is fed into one end of the cylinder by means of a rotary feeder 21 which is mounted upon a shaft 22. This feeder carries outwardly extending fingers 23 which pass between fingers 24 extending upwardly from the bottom 25 of a feed trough 26.

Mounted in bearings 27 carried by the sills 10 is a shaft 28 and this shaft extends through a housing 29 within which operate fan blades 30 which are fast upon the shaft 28. A current of air is thus provided at one end of the cylinder so as to carry the straw longitudinally through the cylinder and out the opposite end. During the passage of the straw through the cylinder, a rotary motion is given the straw by the fingers 18, these fingers successively engaging the straw and due to their rearward inclination, the straw will be carried toward the open end of the cylinder just referred to. The fingers agitating the straw separate the grain therefrom, and the grain passes downward and outward through the lower portion of the cylinder, while the straw is carried outward as explained.

Extending longitudinally below the cylinder is a conveyor 31, the shaft 32 of which is mounted in bearings 33 provided in the frame. This conveyor operates within a trough 34 which extends from the housing 11 and which is in communication with a trough 35. This last mentioned trough houses a conveyor 36, whose shaft 37 is mounted in suitable bearings and carries a sprocket 38 which is driven from a sprocket 39 by a chain 40. The sprocket 39 is mounted upon the shaft 28 and this shaft carries a pulley 41 which is driven by a belt 42 from a pulley 43, fast on the shaft 22. This last mentioned pulley may be driven by a belt 44 from any suitable source of power.

The shaft 28 also passes through a fan housing 45 and has mounted thereon fan blades 46. This housing is in communication with one end of the conveyor trough 35 and has extending therefrom a vertically disposed spout 47 so that grain delivered from the cylinder will be moved by the conveyors 31 and 36 into the housing 45, and will be carried upward through the grain spout 47 into a suitable receptacle.

Mounted in suitable bearings and extending longitudinally along one side of the cylinder 12 is a shaft 48. This shaft extends through a cylindrical housing 49 which may be an extension of the housing 11, and mounted upon this shaft are fan blades 50. The purpose of this fan is to provide a current of air transversely into the cylinder 12 so as to take up and separate the chaff from the grain and arrange it in the path of the air from the fan blades 30 so that the chaff will be carried outward with the straw.

The shaft 28 is geared to the shaft 48 through the medium of worm gearing 51, while the shaft 48 has mounted thereon a sprocket wheel 52, around which passes a chain 53. This chain engages sprocket wheels 54 which are mounted upon the shafts 14, and a sprocket wheel 55 which is mounted upon the conveyor shaft 32, so that the cylinder will be rotated and the conveyor 31 operated. A tightening device 56 is provided by the chain 53 whereby the latter may be properly tensioned.

Extending upwardly and rearwardly above the top of the cylinder 12 is a hollow arm 57. One end of this arm is secured to the frame of the machine and its other rear end is positioned within a support 58 which extends from a suitable part of the frame. A substantially U-shaped arm 59 has one of its ends telescoped within the tubular arm 57 and is slidingly adjusted therein, being held in adjusted position by means of a set screw 60. The other end of the arm 59 extends axially within the cylinder 12 and carries a baffle plate 61. This plate is arranged in the path of the stream of air entering the cylinder 12 and acts to separate this stream and direct it around the inner periphery of the cylinder and retard the passage of the grain and straw therethrough under the influence of the air. The plate may be adjusted toward or away from the entering end of the cylinder and thus regulate the current of air.

The invention is susceptible of various changes in its form, proportions and minor details of construction and the right is herein reserved to make such changes as properly fall within the scope of the appended claims.

Having described the invention what is claimed is:—

1. In a grain separator, a rotatably mounted foraminous cylinder, means to rotate the cylinder, means to feed the material to be separated into said cylinder, spaced rows of longitudinally and circumferentially inclined separating fingers extending inwardly from the cylinder, means at one end of the cylinder to provide a current of air longitudinally through said cylinder to carry straw outward and permit grain to pass into the cylinder, means to provide a current of air transversely through the cylinder to carry the chaff from the grain upwardly and in the path of the longitudinal currents, grain elevating means, and communicating means disposed below the cylinder to convey the grain from the cylinder to the elevating means.

2. In a grain separator, a rotatably mounted foraminous cylinder, means to rotate the cylinder, means to feed the material to be separated into said cylinder, spaced rows of longitudinally and circumferentially inclined separating fingers extending inwardly from the cylinder, means at one end of the cylinder to provide a current of air longitudinally through said cylinder to carry straw outward and permit grain to pass into the cylinder, a baffle plate arranged within the cylinder and opposed to the current of air, means to support the plate and provide for adjustment axially within the cylinder and toward or away from the entrance to regulate the longitudinal air currents, means to provide a current of air transversely through the cylinder to carry the chaff from the grain upwardly and within the path of the longitudinal current, grain elevating means, and means disposed below the cylinder to convey the grain from the cylinder to the elevating means.

3. In a grain separator, a rotatably mounted cylinder comprising a cylindrical frame, a foraminous cover for said frame adapted for the passage of grain, circumferentially spaced longitudinally disposed reinforcing strips secured to the opposite ends of the frame, spaced inclined fingers extending from said strips and looped therethrough disposed longitudinally and circumferentially of the cylinder, means to feed material to be separated into the cylinder, means to blow straw from the cylinder, means to blow chaff from the grain, a communicating trough disposed below the cylinder to receive the separated grain, a conveyor in each trough, and operating means for said conveyors.

In testimony whereof I affix my signature.

HERSCHEL CLIMER.